United States Patent
Homma et al.

(10) Patent No.: US 9,020,313 B2
(45) Date of Patent: Apr. 28, 2015

(54) OPTICAL CABLE

(71) Applicant: Sumitomo Electric Industries, Ltd., Osaka-shi, Osaka (JP)

(72) Inventors: Yuya Homma, Yokohama (JP); Itaru Sakabe, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 14/166,049

(22) Filed: Jan. 28, 2014

(65) Prior Publication Data

US 2014/0219617 A1   Aug. 7, 2014

(30) Foreign Application Priority Data

Feb. 1, 2013   (JP) ................. 2013-018435

(51) Int. Cl.
  *G02B 6/44*   (2006.01)
(52) U.S. Cl.
  CPC ............ *G02B 6/4432* (2013.01); *G02B 6/4403* (2013.01)

(58) Field of Classification Search
  CPC ... G02B 6/4403; G02B 6/4432; G02B 6/4436
  USPC ......................................... 385/101, 107, 114
  See application file for complete search history.

(56) References Cited

U.S. PATENT DOCUMENTS

| | | | | |
|---|---|---|---|---|
| 5,042,903 | A | * | 8/1991 | Jakubowski .................. 385/101 |
| 6,028,975 | A | * | 2/2000 | Davidson ...................... 385/102 |
| 2006/0159407 | A1 | * | 7/2006 | Kachmar ...................... 385/102 |

FOREIGN PATENT DOCUMENTS

JP   2012-043557 A   3/2012

* cited by examiner

*Primary Examiner* — Ryan Lepisto
(74) *Attorney, Agent, or Firm* — Drinker Biddle & Reath LLP

(57) ABSTRACT

An optical cable includes an optical fiber ribbon core wire provided with an optical fiber having a core and a cladding that surrounds the core, a sheath that surrounds the optical fiber ribbon core wire, and a braid arranged inside the sheath. The braid is formed to include wires woven with each other. In the optical cable, the wire that forms the braid is pushed into the sheath so that the sheath is integrated with the braid.

9 Claims, 16 Drawing Sheets

Fig. 12

| | | | Examples | | | | | | | | | | Comparative Example |
|---|---|---|---|---|---|---|---|---|---|---|---|---|---|
| | | | 1 | 2 | 3 | 4 | 5 | 6 | 7 | 8 | 9 | 10 | |
| Cable | Structure | | A-1 | A-1 | A-1 | A-1 | A-1 | A-2 | A-3 | A-4 | A-4 | A-5 | A-1 |
| | Sheath material | | PVC | PVC | PVC | PVC | PVC | PVC | PVC | PVC | TPU | PVC | PVC |
| | Outer diameter of sheath [mm] | | 4.2 | 4.2 | 4.2 | 4.2 | 4.2 | 4.2 | 4.2 | 4.2 | 4.2 | 4.2 | 4.2 |
| | Inner diameter of sheath [mm] | | 3.3 | 3.3 | 3.3 | 3.3 | 3.3 | 3.0 | 3.3 | 2.8 | 2.8 | 2.8 | 3.3 |
| | Stitches on inside | | Present | Present | Present | Present | Present | Present | Present | Present | Present | Present | Absent |
| | Withdrawal force [N] | | 8.7 | 12.1 | 9.1 | 7.0 | 16.0 | 18.5 | 6.2 | 2.2 | 26.0 | 21.0 | 2.5 |
| | Adhesion force between sheath and braid [N/mm] | | 0.8 | 1.2 | 0.9 | 0.7 | 1.5 | 2.0 | 0.6 | 0.25 | 3.0 | 2.4 | 0.2 |
| | Outer diameter of tube [mm] | | 2.0 | 2.0 | 2.0 | 2.0 | 2.0 | 2.0 | 2.0 | 2.0 | 2.0 | 2.0 | 2.0 |
| | Inner diameter of tube [mm] | | 1.0 | 1.4 | 1.4 | 1.4 | 1.4 | 1.0 | 1.0 | 1.0 | 1.0 | 1.0 | 1.0 |
| Fiber | Structure | | B-1 | B-2 | B-3 | B-4 | B-5 | B-2 | B-1 | B-1 | B-1 | B-1 | B-1 |

Fig.13

|  | Kinds of structures of optical fibers | | | | |
|---|---|---|---|---|---|
|  | B-1 | B-2 | B-3 | B-4 | B-5 |
| Fiber types | HPCF | HPCF | AGF | AGF | AGF |
| Numerical Aperture NA | 0.29 | 0.29 | 0.29 | 0.20 | 0.29 |
| Core diameter [μm] | 80 | 80 | 80 | 50 | 80 |
| Cladding diameter [μm] | 125 | 125 | 100 | 105 | 125 |
| Adhesion coating diameter [μm] | — | — | 125 | 125 | — |
| Primary diameter [μm] | — | 200 | 200 | 200 | 200 |
| Secondary diameter [μm] | — | 245 | 245 | 245 | 245 |
| Colored diameter [μm] | 135 | 255 | 255 | 255 | 255 |

Fig.14

| | | Examples | | | | | | | | | | Comparative Example |
|---|---|---|---|---|---|---|---|---|---|---|---|---|
| | | 1 | 2 | 3 | 4 | 5 | 6 | 7 | 8 | 9 | 10 | |
| Characteristics | Sheath shrinkage ratio | 0.10% | 0.05% | 0.08% | 0.15% | 0.05% | 0.04% | 0.30% | 1.00% | 0.01% | 0.02% | 3.8% |
| | Temperature characteristic | A | A | A | A | A | A | A | A | A | A | C |
| | Lateral pressure test | A | A | A | A | A | B | A | A | A | B | A |
| | Bending test | A | A | A | B | A | A | A | A | A | A | A |
| | Shock test | A | A | A | A | B | B | A | A | A | B | A |
| | Pinch test | A | A | A | A | A | A | A | A | A | A | A |

OPTICAL CABLE

TECHNICAL FIELD

The present invention relates to an optical cable.

BACKGROUND

Conventionally, in the field of connecting devices or components in a device for signal transmission (hereinafter referred to as "interconnection field"), metal cables have been used. However, with increase in transmission capacity and faster transmission speed, optical cables have recently been introduced in place of metal cables (see, for example, Japanese Patent Application Laid-Open Publication No. 2012-043557).

SUMMARY

When generally used trunk optical cables are used in the interconnection field as they are, steel wires included in the optical cables impair the flexibility of the optical cables that is required in the interconnection field. However, with a construction in which steel wires are merely removed from a trunk optical cable, when shrinkage on the sheath of the optical cable due to low temperatures occurs, the internal optical fiber waves to increase transmission loss. Therefore, in the optical cables for use in the interconnection field, it is required to prevent increase in transmission loss, for example, when the optical cables have shrunk while keeping the flexibility of the optical cables.

According to one aspect, the present invention relates to an optical cable. The optical cable includes an optical fiber having a core and a cladding that surrounds the core, a sheath that surrounds the optical fiber, and a braid arranged inside the sheath, the braid formed to include a wire. In this optical cable, the wire that forms the braid is pushed into the sheath so that the sheath is integrated with the braid.

BRIEF DESCRIPTION OF THE DRAWINGS

FIG. 12 is a table illustrating structures of optical cables in Examples and Comparative Example.

FIG. 13 is a table illustrating structures of optical fibers used in the optical cables in Examples and Comparative Example.

FIG. 14 is a table illustrating evaluation results of the optical cables in Examples and Comparative Example.

DETAILED DESCRIPTION

Description of Embodiments

Figure 1:
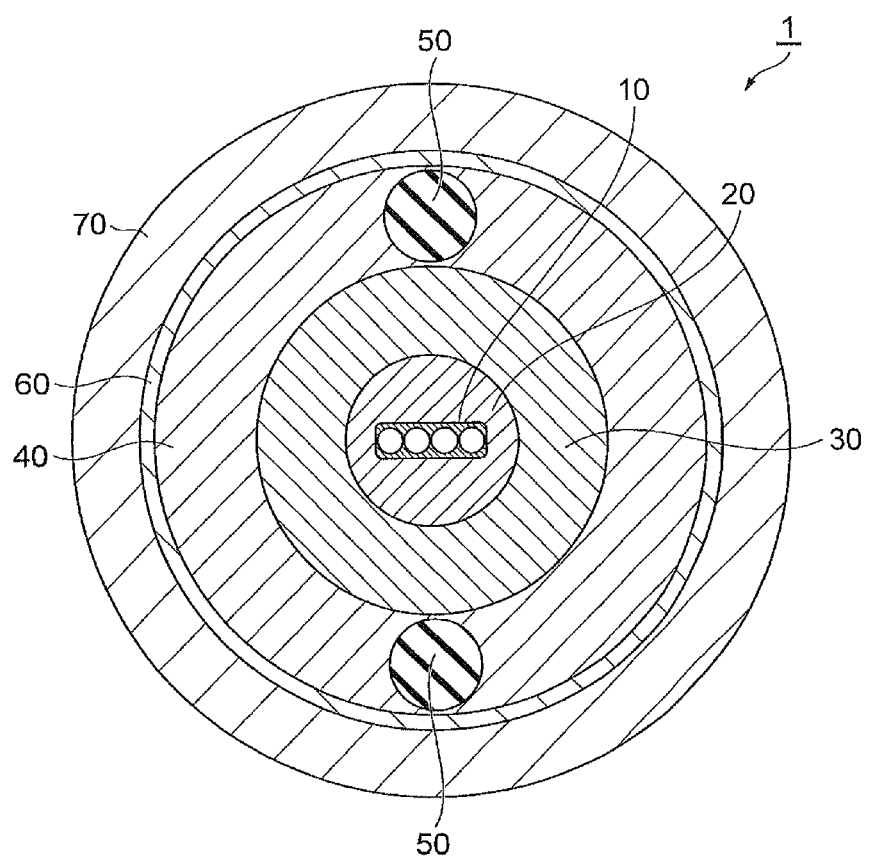
FIG. 1 is a cross-sectional view of an optical cable according to a first embodiment.

First of all, embodiments of the invention of the subject application will be described one by one.

According to one aspect, the present invention relates to an optical cable. The optical cable includes an optical fiber having a core and a cladding that surrounds the core, a sheath that surrounds the optical fiber, and a braid arranged inside the sheath, the braid fowled to include a wire. In this optical cable, the wire that forms the braid is pushed into the sheath so that the sheath is integrated with the braid.

In this optical cable, the wire that forms the braid is pushed into the sheath so that the sheath is integrated with the braid. In this case, the braid can function as a tension member, so that shrinkage of the sheath integrated with the braid is suppressed. Accordingly, serpentine of the optical fiber caused by shrinkage of the sheath due to low temperatures is also suppressed, and increase in transmission loss of the optical cable is prevented. The flexibility of the optical cable can also be kept because the braid is used as a shrink-resistant member. The wording that the wire that forms the braid is pushed into the sheath so that the sheath is integrated with the braid specifically means, for example, the state described below. Since the sheath is soft before the sheath hardens when the sheath is put on the braid, the sheath is depressed at a portion coming into contact with the surface of the braid (each wire that forms the braid), so that the surface pattern (mesh) of the braid is left on the inner surface of the sheath to allow each wire to be fitted in the depression. That is, the braid is shaped so as to slightly dig into the sheath, whereby the braid and the sheath are integrated.

In the optical cable described above, it is preferable that an adhesion force between the sheath and the braid be 0.25 N/mm or more and 3.0 N/mm or less. If the adhesion force between the sheath and the braid is less than 0.25 N/mm, the temperature characteristic of the optical cable is poor, whereas if the adhesion force between the sheath and the braid exceeds 3.0 N/mm, removal of the sheath is difficult, resulting in poor terminal workability. The "temperature characteristic" refers to such a characteristic that hot and cold temperature changes have little effect on the transmission loss. If the optical cable has a good temperature characteristic, even when a heat cycle between low temperature and high temperature is performed multiple times, the transmission loss of the optical cable is small.

In the optical cable described above, it is preferable that a shrinkage ratio of the sheath be 1.0% or less when the optical cable is heated at 110° C. for two hours. When the shrinkage ratio of the sheath is 1.0% or less, the temperature characteristic of the optical cable is better.

The optical cable described above may further include an inner tube arranged inside the braid and a tension fiber. The optical fiber and the tension fiber may be arranged in an interior space of the inner tube. In this case, the inner tube is present between the optical fiber and the braid thereby preventing the optical fiber from coming into direct contact with the braid and being damaged. The presence of the inner tube can improve the shock characteristic. The arrangement of the tension fiber and the optical fiber in the same space can further improve the shock characteristic. The "shock characteristic" refers to such a characteristic that shock on the optical cable from the outside has little effect on the transmission loss. If the optical cable has a good shock characteristic, for example, even when a weight is dropped from a predetermined height at the same position on the optical cable a predetermined number of times, the transmission loss of the optical cable is small.

The optical cable described above may further include a metal wire that is an electric wire having a conductor covered with insulation and is arranged inside the braid. In this case, the metal wire can provide the optical cable with a power feed function and a slow signal communication function. The metal wire may be a coaxial wire. Being a coaxial wire enables slow signal communication over a longer distance.

The optical cable described above may further include plastic yarn arranged inside the braid. When the core before braiding is not circular, projections and depressions are formed on the cable to cause poor appearance. For example, when the metal wire is arranged, the plastic yarn is arranged and filled in the space on the outer periphery of the metal wire, whereby the core before braiding can be formed into a circle shape.

It is preferable that the metal wire and the plastic yarn be arranged to be twisted in a longitudinal direction. The twisting prevents production of bending directivity of the cable and enables uniform bending in any direction.

In the optical cable described above, it is preferable that the optical fiber be in the shape of a ribbon. In this case, intersection of optical fibers can be prevented, and the lateral pressure characteristic of the optical cable can be improved. The "lateral pressure characteristic" refers to such a characteristic that a lateral pressure load applied to the optical cable has little effect on the transmission loss. If the optical cable has a good lateral pressure characteristic, for example, even when a predetermined load is applied on the optical cable using a mandrel, the transmission loss of the optical cable is small.

In the optical cable described above, it is preferable that a diameter of a glass region that forms the optical fiber be 105 μm or less. In this case, the possibility of breakage of the optical cable due to bending can be reduced. In the optical cable described above, the core of the optical fiber may be made of glass, and the cladding of the optical fiber may be made of plastic.

Details of Embodiments

Specific examples of the optical cable according to embodiments of the present invention will be described below with reference to the drawings. It should be noted that the present invention is not limited to these examples but shown in the claims, and it is intended that all modifications that come within the meaning and range of equivalence to the claims should be embraced herein. In the description, the same elements or elements having the same function are denoted with the same reference signs, and an overlapping description will be omitted.

FIG. 1 is a cross-sectional view of an optical cable 1 according to a first embodiment. FIG. 1 illustrates a cross section perpendicular to the axial direction of the optical cable. The optical cable 1 includes an optical fiber ribbon core wire 10, a tension fiber 20, an inner tube 30, plastic yarn 40, coaxial electric wires (metal wires) 50, a braid 60, and a sheath 70.

The optical fiber ribbon core wire 10 (10A to 10E, see FIG. 6 to FIG. 10) is formed by integrating a plurality of optical fibers arranged in parallel. The plurality of optical fibers are generally even-numbered optical fibers. The inner tube 30 is provided so as to surround the optical fiber ribbon core wire 10. That is, the optical fiber ribbon core wire 10 is inserted in the interior space of the inner tube 30. The inner tube 30 is made of, for example, polyvinyl chloride (PVC), and a single optical fiber ribbon core wire 10 is inserted in the interior space of the inner tube 30. Since the optical fiber ribbon core wire 10 including optical fibers is inserted in the inner tube 30, the optical fibers do not come into contact with the braid 60 to deteriorate the lateral pressure characteristic, and the shock characteristic is also improved.

The tension fiber 20 is provided in the interior space of the inner tube 30 so as to cover the periphery of the optical fiber ribbon core wire 10. For example, aramid fibers ("Kevlar (registered trademark)" manufactured by DUPONT-TORAY CO., LTD. or "Technora (registered trademark)" manufactured by TEIJIN LIMITED) is preferably used as the tension fiber 20. Because of the provision of such a tension fiber 20, elongation distortion is unlikely to be applied to the optical fibers when the optical cable 1 is pulled. In addition, the cushion effect of the tension fiber 20 functions as protector protecting the optical fibers from external shock.

The sheath 70 is provided so as to surround the inner tube 30. The sheath 70 is to protect the optical cable 1 and is formed of, for example, a thermoplastic resin. Specifically, the sheath 70 is formed of thermoplastic polyurethane (TPU), polyvinyl chloride (PVC), fluoropolymer (low melting point THV (a terpolymer of tetrafluoroethylene, hexafluoropropylene, and vinylidene fluoride) is preferred), or silicone.

Figure 15:
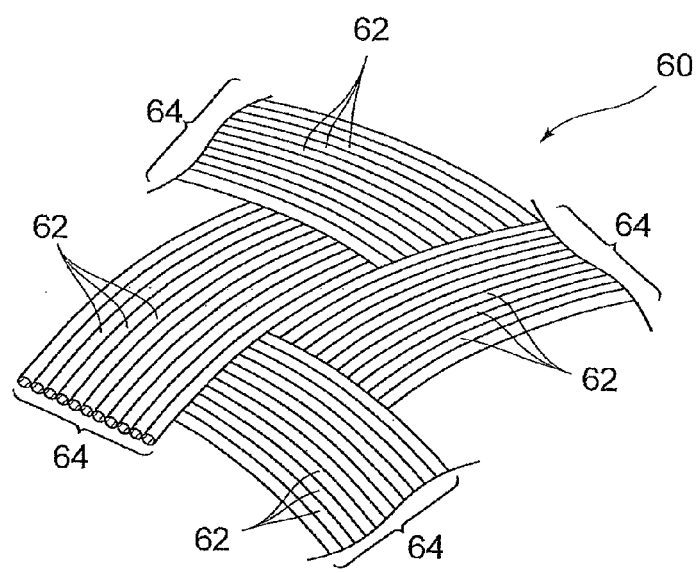
FIG. 15 is a partial enlarged perspective view illustrating one example of a braid used for optical cable.
Figure 16:
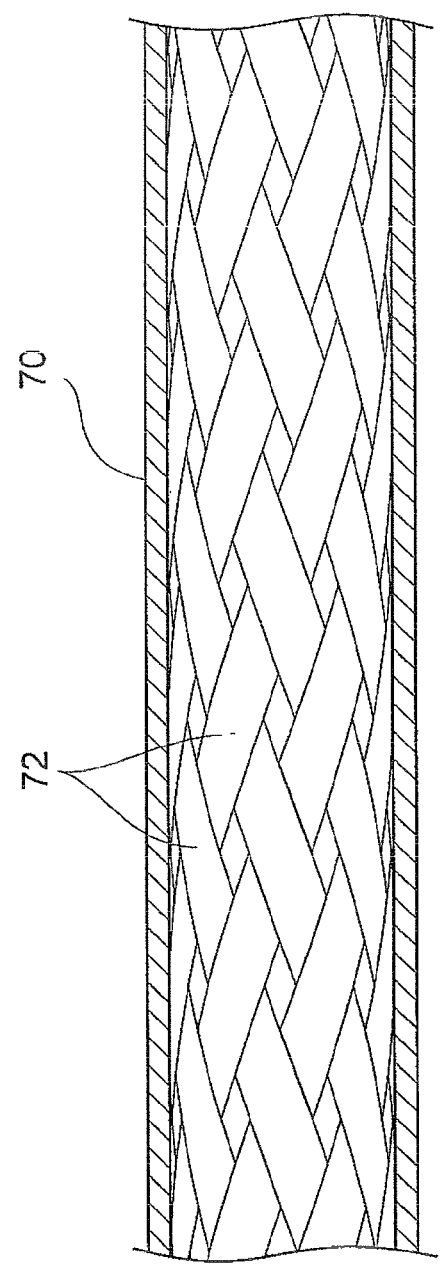
FIG. 16 is a cross-sectional view illustrating an inner periphery surface of a sheath when the sheath is removed from a braid.

Inside the sheath 70, the braid 60 having a plurality of stitches is arranged so as to adhere to the inner peripheral surface of the sheath 70. As illustrated in FIG. 15, the braid 60 is formed, for example, by weaving each unit 64 in a mesh, in which a few tens of copper wires (wire) 62 having a diameter of a few tens of μm are lined up. The stitches, which are knitted stitches, are arranged so as to dig into the inner peripheral surface of the sheath 70. That is, the copper wires 62 that form the braid 60 are pushed into the inner peripheral surface of the sheath 70. In this way, the braid 60 and the sheath 70 are adhered to and integrated with each other, and the braid 60 functions as a shrink-resistant member for the optical cable 1. The braid 60 is formed with copper wires 62 having a diameter of a few tens of μm and has sufficient flexibility because it is thin. As illustrated in FIG. 16, the wording "the braid 60 digs into the sheath 70" refers to a state in which the trace 72 of the mesh of the braid 60 is left on the inside of the sheath 70 when the sheath 70 is removed from the braid 60. FIG. 16 is a cross-sectional view illustrating an inner periphery surface of a sheath 70 when the sheath 70 is removed from a braid 60. To integrate the sheath 70 and the braid 60, the sheath 70 is put on the braid 60 first. Here, the sheath 70 pushes the braid 60 toward the center axis of the optical cable 1. Since the sheath 70 is soft before the sheath 70 hardens, the sheath 70 is depressed at a portion coming into contact with the surface of the braid 60 (each wire 62 that forms the braid), so that a surface pattern (mesh) of the braid 60 is left on the inner surface of the sheath 70 to allow each wire 62 to be fitted in the depression. In this way, the braid 60 is shaped so as to slightly dig into the sheath 70, whereby the braid 60 and the sheath 70 are integrated. FIG. 15 and FIG. 16 are schematic views, so these figures may not fully correspond with each other.

In the optical cable 1, shrinking forces due to iteration of the heat cycles of low temperatures and high temperatures act on the sheath 70. However, since the braid 60 and the sheath 70 are integrated, the braid 60 functions as a shrink-resistant member to suppress shrinkage of the sheath 70. As a result, serpentine of the optical fiber caused by shrinkage of the sheath 70 or increase in transmission loss due to the serpentine can be suppressed properly.

The braid 60 and the sheath 70 can be integrated, for example, by performing full extrusion during extrusion of the sheath 70. The full extrusion allows resin to be extruded with pressure applied on the braid 60, thereby improving the adhesion force between the braid 60 and the sheath 70. When a resin having a high MFR (melt flow rate) is used as the material of the sheath 70, the resin viscosity during extrusion can be reduced, so that the amount of the resin (that is, the sheath 70) dug by the braid 60 is increased, and the adhesion force between the sheath 70 and the braid 60 can be further improved.

In this way, in the optical cable 1, the adhesion force between the braid 60 and the sheath 70 is improved. For example, the adhesion force between the braid 60 and the sheath 70 is 0.25 N/mm or more and 3.0 N/mm or less. When the adhesion force between the braid 60 and the sheath 70 is less than 0.25 N/mm, the adhesion force is not enough, possibly resulting in a poor temperature characteristic. When the adhesion force between the braid 60 and the sheath 70 exceeds 3.0 N/mm, removal of the sheath 70 from the braid 60 during terminal processing is difficult, resulting in reduced workability.

Figure 11:
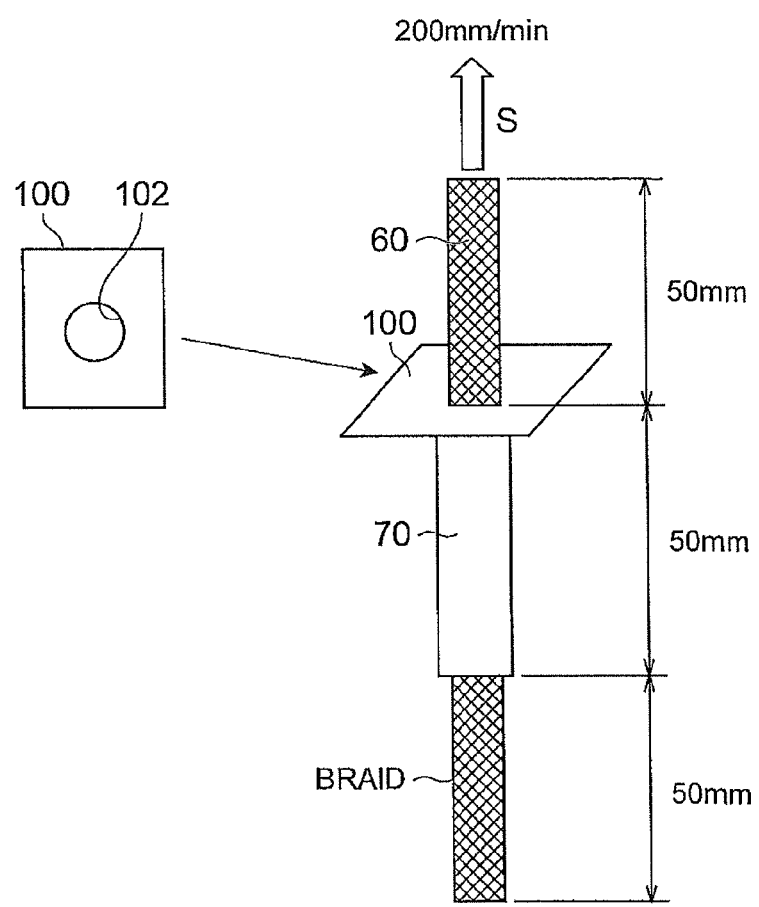
FIG. 11 is a diagram schematically illustrating a method for measuring an adhesion force between a sheath and a braid.

The "adhesion force" here is measured in the manner illustrated in FIG. 11. Specifically, first, only the sheath 70 of the optical cable 1 is stripped off to expose the braid 60. The optical cable 1 is then inserted into a jig 100 having a hole 102 sized to allow the braid 60 to pass therethrough. The jig 100 is fixed so as not to move in the length direction (the up/down direction in FIG. 11) of the optical cable. The withdrawal force [N] with which the remaining sheath 70 is stripped off from the braid 60 is measured by pulling up the optical cable 1 in the direction of the arrow S at 200 mm/min. Finally, the adhesion force [N/mm] is calculated by dividing the measured withdrawal force [N] by the circumference [mm] of the inside of the sheath 70. The circumference of the inside of the sheath 70 is calculated by multiplying the inner diameter of the sheath 70 by the circular constant.

Between the sheath 70 and the inner tube 30, two coaxial electric wires 50 are arranged symmetrically, and a surrounding space thereof is filled with the plastic yarn 40. The plastic yarn 40 is, for example, PP yarn made of polypropylene that is preferably subjected to low shrink processing. The inclusion of the coaxial electric wires 50 imparts a slow signal communication function to the optical cable 1. The space in which the coaxial electric wires 50 are arranged is filled with the plastic yarn 40 to prevent formation of a space inside the cable, and protrusions and depressions on the sheath. Accordingly, the shape of the optical cable 1 can be kept in a circle in a cross section perpendicular to the length direction of the optical cable 1 as illustrated in FIG. 1.

The coaxial electric wires 50 and the plastic yarn 40 are arranged so as to be twisted around the outer periphery of the inner tube 30, for example, at 60 mm pitch in the axial direction of the optical cable 1. It is preferable that the outer periphery of the plastic yarn 40 and the coaxial electric wires 50 be pressure-wrapped with a paper tape, a PET tape, an aluminum tape, or the like in order to prevent deformation. The pressure wrapping can keep the cross section (the cross section perpendicular to the length direction) of the braid in the shape of a circle when the braid is woven on the pressure-wrapped workpiece during the manufacturing process of the optical cable 1.

Since the optical cable 1 formed as described above includes one and only optical fiber ribbon core wire 10, optical fiber ribbon core wires do not intersect each other, or a plurality of optical fibers included in a single optical fiber ribbon core wire 10 do not intersect each other. Therefore, increase in transmission loss when a lateral pressure is applied can be suppressed. Accordingly, the optical fibers in the shape of a ribbon are arranged together with the tension fiber 20 in the inner tube 30.

Examples of the optical fiber ribbon core wire 10 used in the optical cable 1 will now be described with reference to FIG. 6 to FIG. 10.

FIG. 6 to FIG. 10 each illustrate a cross-sectional construction example of the optical fiber ribbon core wire 10. Each of optical fiber ribbon core wires 10A to 10E illustrated in these figures may be used as the optical fiber ribbon core wire 10 of the optical cable 1 in the present embodiment and optical cables 2 to 5 described later. In the following description, the optical fiber ribbon core wires 10A to 10E each include four fibers, although not being limited thereto.

Figure 6:
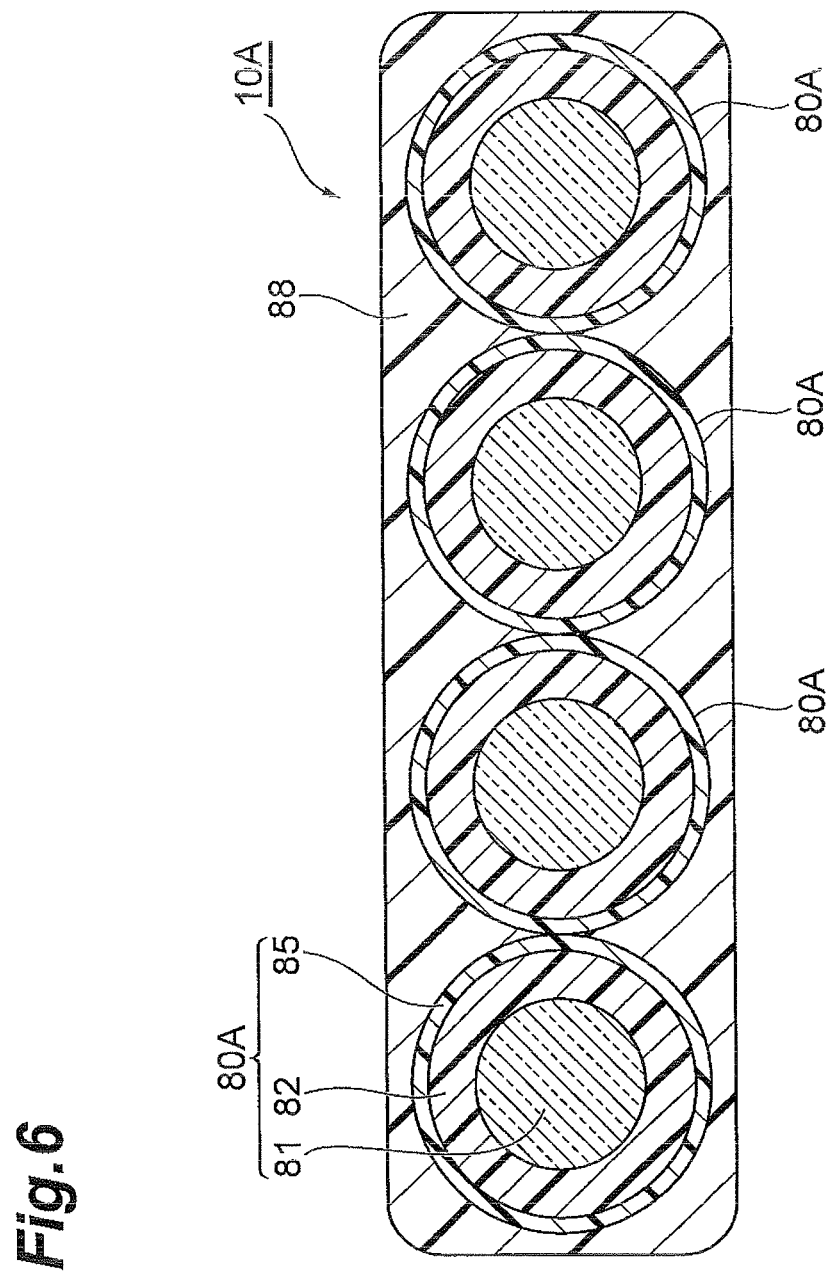
FIG. 6 is a diagram illustrating a cross-sectional construction example of an optical fiber ribbon core wire 10A.

The optical fiber ribbon core wire 10A illustrated in FIG. 6 is formed of four optical fibers 80A arranged in parallel and integrated with a coating 88. Each optical fiber 80A is an HPCF (Hard Plastic Clad Fiber) and has a core 81 made of glass, a cladding 82 made of plastic and surrounding the core 81, and a colored layer 85 surrounding the cladding 82. In the optical fiber 80A, for example, the diameter of the core 81 is 80 μm, the outer diameter of the cladding 82 is 125 μm, and the outer diameter of the colored layer 85 is 135 μm. The cladding 82 is formed, for example, of a UV curable resin including fluorine.

A UV curable resin that is colored with the addition of a pigment or the like can be used as the colored layer 85. The optical fiber ribbon core wires are colored with different colors, so that each optical fiber ribbon core wire can be identified by the corresponding color. The optical fiber 80A preferably has a numerical aperture NA of 0.20 or more, more preferably 0.24 or more, in order to suppress increase in transmission loss even when being bent. The optical fiber 80A in the present embodiment has a numerical aperture of, for example, 0.29.

When being connected at a cable terminal, such an optical fiber 80A has the colored layer 85 removed to make a fiber diameter thereof 125 μm and is then inserted and fixed in a fiber fixing member called a ferrule.

Figure 7:
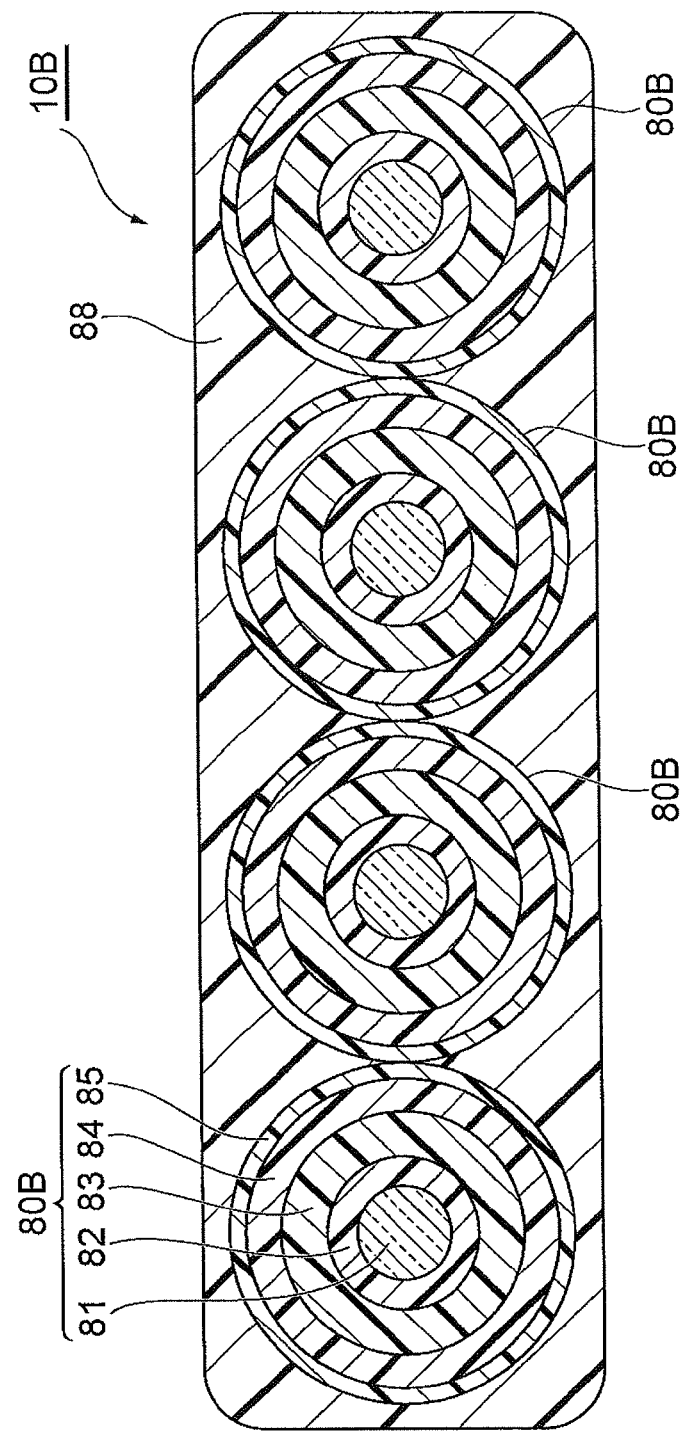
FIG. 7 is a diagram illustrating a cross-sectional construction example of an optical fiber ribbon core wire 10B.

The optical fiber ribbon core wire 10B illustrated in FIG. 7 is formed of four optical fibers 80B arranged in parallel and integrated with a coating 88. Each optical fiber 80B is an HPCF and has a core 81 made of glass, a cladding 82 made of plastic and surrounding the core 81, a primary coating layer 83 surrounding the cladding 82, a secondary coating layer 84 surrounding the primary coating layer 83, and a colored layer 85 surrounding the secondary coating layer 84. In the optical fiber 80B, for example, the diameter of the core is 80 μm, the outer diameter of the cladding 82 is 125 μm, and the diameter of the primary coating layer 83 is 200 μm, the diameter of the secondary coating layer 84 is 245 μm, and the outer diameter of the colored layer 85 is 255 μm.

As the primary coating layer 83 and the secondary coating layer 84, the same ones as used in normal optical fiber ribbon core wires can be used. For example, a urethane (meth)acrylate-based UV curable resin can be used. A relatively soft resin having a relatively low Young's modulus (0.1 to 10 MPa) is used for the primary coating layer 83, and a relatively hard resin having a relatively high Young's modulus (200 to 1500 MPa) is used for the secondary coating layer 84. When compared with the optical fiber ribbon core wile illustrated in FIG. 6, the lateral pressure characteristic is further superior because of the presence of the primary coating layer 83 and the secondary coating layer 84.

When being connected at a cable terminal, such an optical fiber 80B has the primary coating layer 83, the secondary coating layer 84, and the colored layer 85 removed to make a fiber diameter thereof 125 μm and is inserted and fixed in a fiber fixing member called a ferrule. The optical fiber 80B has a numerical aperture NA of, for example, 0.29 in order to prevent increase in transmission loss even when being bent.

Figure 8:
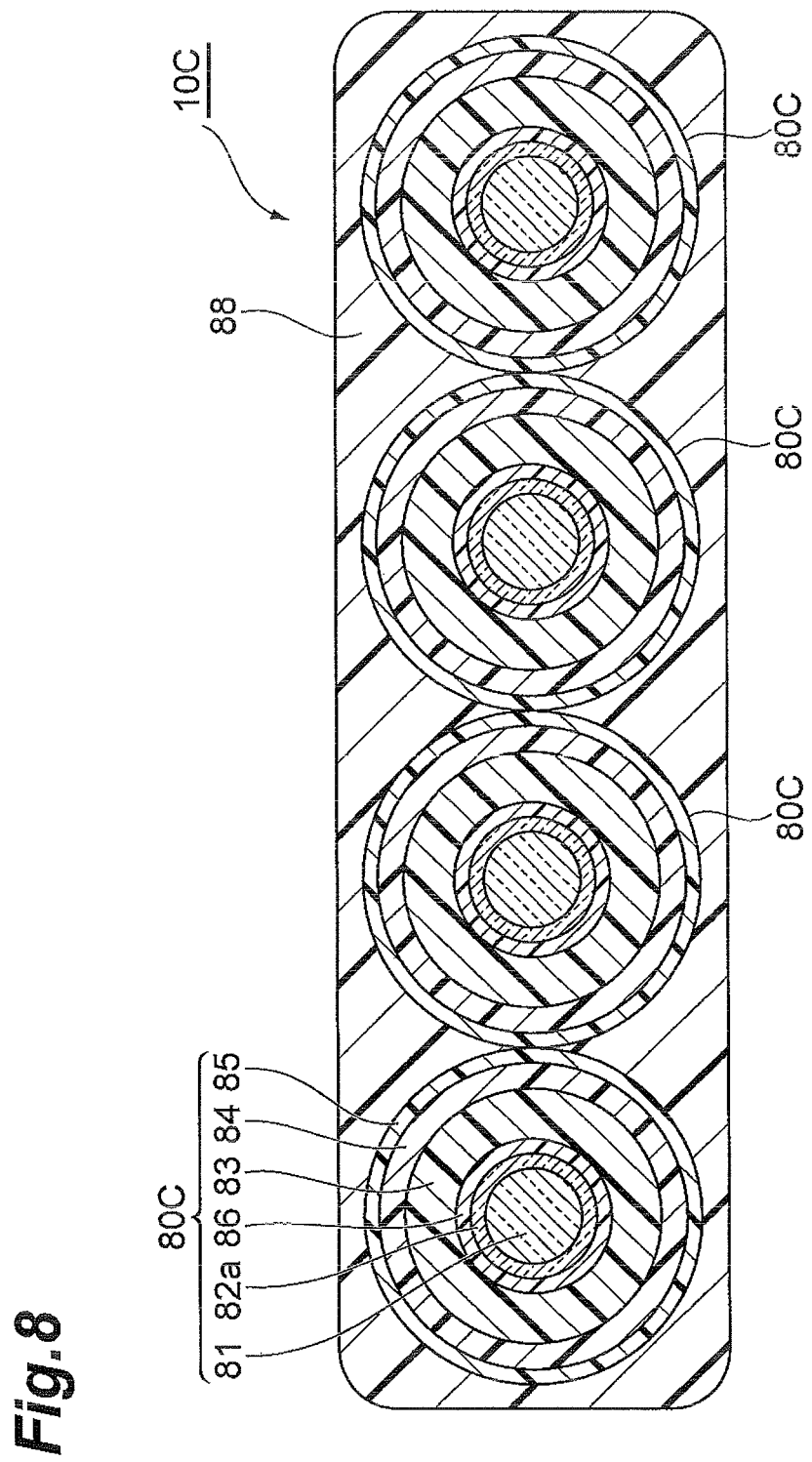
FIG. 8 is a diagram illustrating a cross-sectional construction example of an optical fiber ribbon core wire 10C.

The optical fiber ribbon core wire 10C illustrated in FIG. 8 is formed of four optical fibers 80C arranged in parallel and integrated with a coating 88. Each optical fiber 80C is an AGF (All Glass Fiber) and has a core 81 made of glass, a cladding 82a made of glass and surrounding the core 81, an adhesion coating layer 86 surrounding the cladding 82a, a primary coating layer 83 surrounding the adhesion coating layer 86, a secondary coating layer 84 surrounding the primary coating layer 83, and a colored layer 85 surrounding the secondary coating layer 84.

In the optical fiber 80C, for example, the diameter of the core is 80 μm, the outer diameter of the cladding 82a is 100 μm, the diameter of the adhesion coating layer 86 is 125 μm, the diameter of the primary coating layer 83 is 200 μm, the diameter of the secondary coating layer 84 is 245 μm, and the outer diameter of the colored layer 85 is 255 μm. The optical fiber 80C has a numerical aperture NA of, for example, 0.29 in order to suppress increase in transmission loss even when being bent.

Figure 9:
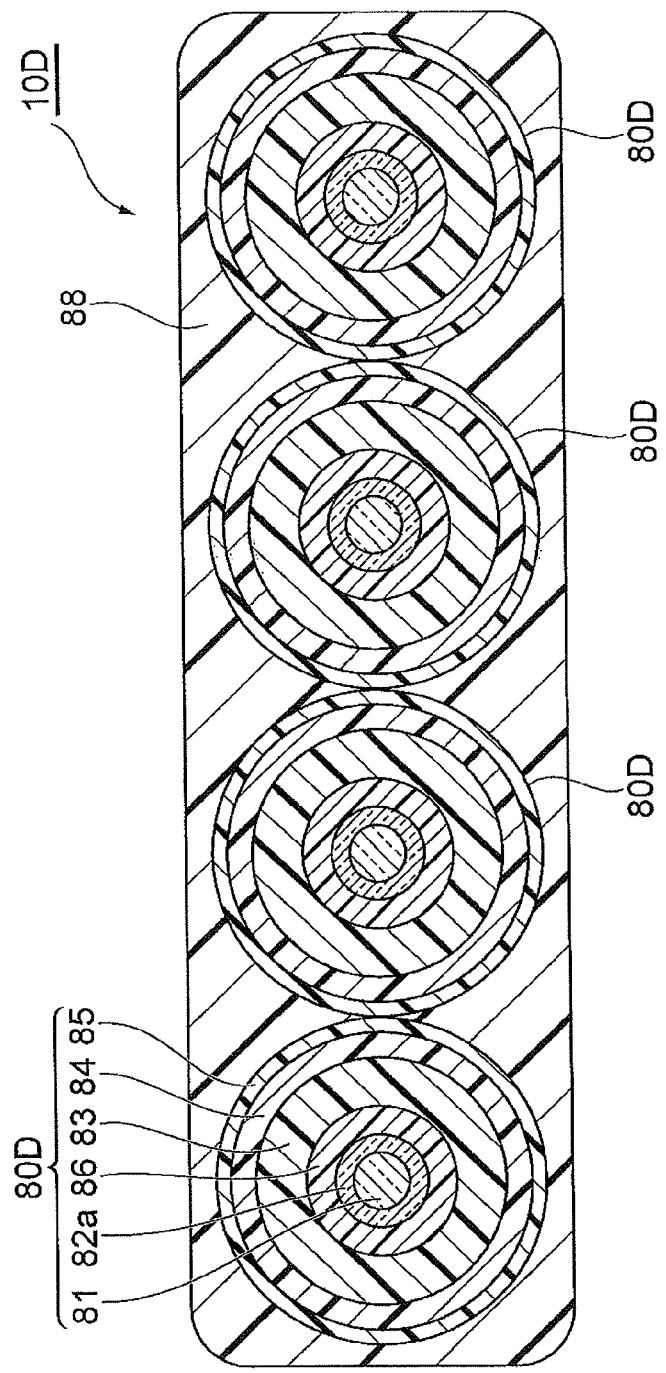
FIG. 9 is a diagram illustrating a cross-sectional construction example of an optical fiber ribbon core wire 10D.

The optical fiber ribbon core wire 10D illustrated in FIG. 9, which has the same basic construction as that of the optical fiber ribbon core wire 10C, is formed of four optical fibers 80D arranged in parallel and integrated with a coating 88, and has a core 81 made of glass, a cladding 82a made of glass, an adhesion coating layer 86, a primary coating layer 83, a secondary coating layer 84, and a colored layer 85. However, their specific diameters are different. In the optical fiber 80D, for example, the diameter of the core is 50 μm, the outer diameter of the cladding 82a is 105 μm, the diameter of the adhesion coating layer 86 is 125 μm, the diameter of the primary coating layer 83 is 200 μm, the diameter of the secondary coating layer 84 is 245 μm, and the outer diameter of the colored layer 85 is 255 μm. The optical fiber 80D has a numerical aperture NA of, for example, 0.20 in order to suppress increase in transmission loss even when being bent.

When the optical fibers 80C, 80D of the optical fiber ribbon core wires 10C, 10D illustrated in FIG. 8 and FIG. 9 are inserted and fixed in a ferrule, the primary coating layer 83, the secondary coating layer 84, and the colored layer 85 are removed while the adhesion coating layer 86 having an adhesion coating diameter of 125 μm is not removed, because the adhesion coating layer 86 has a high adhesion force with glass and is not easily stripped. Because most of ferrules for general-purpose applications have such a hole diameter that allows a fiber with an outer diameter of 125 μm to be inserted therein, the optical fibers 80C, 80D with such an adhesion coating diameter are easily inserted and fixed.

Figure 10:
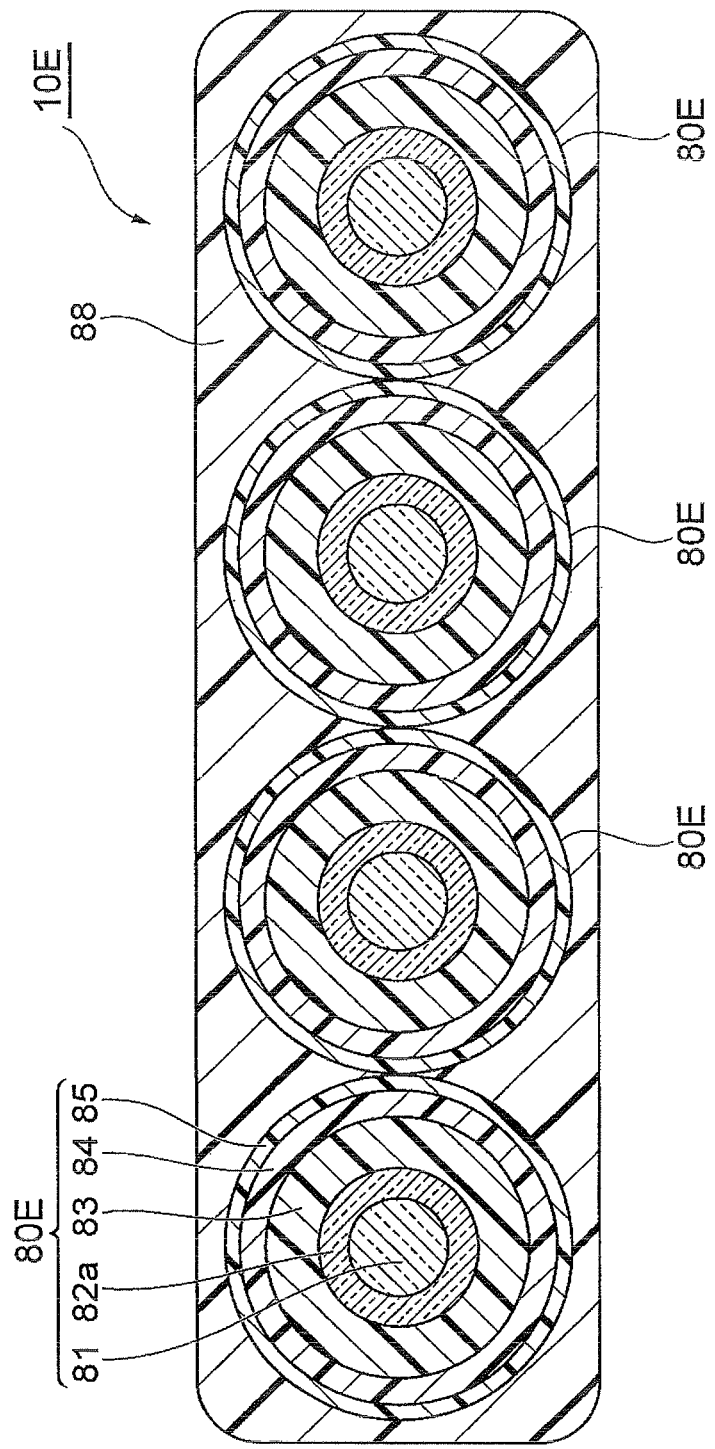
FIG. 10 is a diagram illustrating a cross-sectional construction example of an optical fiber ribbon core wire 10E.

The optical fiber ribbon core wire 10E illustrated in FIG. 10 is formed of four optical fibers 80E arranged in parallel and integrated with a coating 88. Each optical fiber 80E is an AGF and has a core 81 made of glass, a cladding 82a made of glass and surrounding the core 81, a primary coating layer 83 surrounding the cladding 82a, a secondary coating layer 84 surrounding the primary coating layer 83, and a colored layer 85 surrounding the secondary coating layer 84.

In the optical fiber 80E, for example, the diameter of the core is 80 μm, the outer diameter of the cladding 82a is 125 μm, the diameter of the primary coating layer 83 is 200 μm, the diameter of the secondary coating layer 84 is 245 μm, and the outer diameter of the colored layer 85 is 255 μm. The optical fiber 80E has a numerical aperture NA of, for example, 0.29 in order to suppress increase in transmission loss even when being bent.

In each of the optical fibers 80A to 80E, the core 81 has a refractive index higher than the refractive index of the claddings 82, 82a and can guide propagation of light. Each of the optical fibers 80A to 80E is preferably, for example, a multi-mode fiber. The use of a multi-mode fiber having a core diameter larger than a single-mode fiber can enhance the coupling efficiency of optically coupling each of the optical fibers 80A to 80E with a VCSEL (Vertical Cavity Surface Emitting LASER) or a PD (Photodiode). Accordingly, the cost can also be reduced.

In the case of multi-mode fibers, the optical fibers 80A to 80E are preferably of the graded index type in order to ensure a broad band. In order to suppress increase in transmission loss due to bending, a trenched multi-mode fiber may be used, in which the refractive index of the region immediately outside of the core is smaller than that of a normal cladding section. The optical fibers 80A to 80E are not limited to the foregoing examples, and any other optical fibers can be used as appropriate.

As described above, in each of the optical fibers 80A to 80D, the numerical aperture NA is preferably 0.20 or more, more preferably 0.24 or more.

In each of the optical fibers 80A to 80E, the diameter of the glass region that forms the core or the cladding is preferably 105 μm or less. In the interconnection field or data center applications, optical cables are used in the vicinity of equipment such as personal computers and therefore touched by people more frequently than optical cables for long-distance communication. In this case, excessive bending may be applied to the optical cable, in which case it is required that the optical fiber should not be broken for a long time even when the optical cable is left folded 180 degrees. An example of means for making an optical fiber unlikely to be broken is reducing a glass diameter thereof. Setting the glass diameter to 105 μm or less, which is thinner than 125 μm for the glass diameter of a normal optical fiber, can make the optical fibers 80A to 80E unlikely to be broken even with a small bending diameter.

Figure 2:
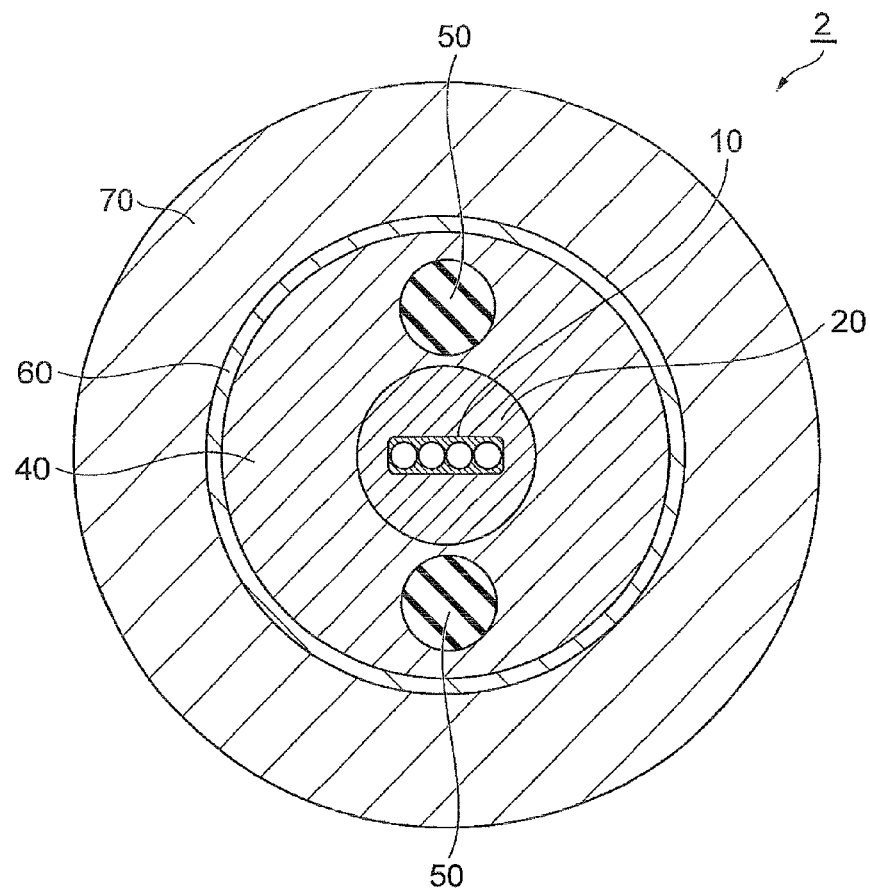
FIG. 2 is a cross-sectional view of an optical cable according to a second embodiment.

FIG. 2 is a cross-sectional view of an optical cable 2 according to a second embodiment. FIG. 2 illustrates a cross section perpendicular to the axial direction of the optical cable 2. The optical cable 2 includes an optical fiber ribbon core wire 10, a tension fiber 20, plastic yarn 40, coaxial electric wires 50, a braid 60, and a sheath 70, in the same manner as in the optical cable 1 according to the first embodiment. However, the optical cable 2 according to the second embodiment differs from the first embodiment in that it does not include the inner tube 30 and that the tension fiber 20 is surrounded with the plastic yarn 40.

Figure 3:
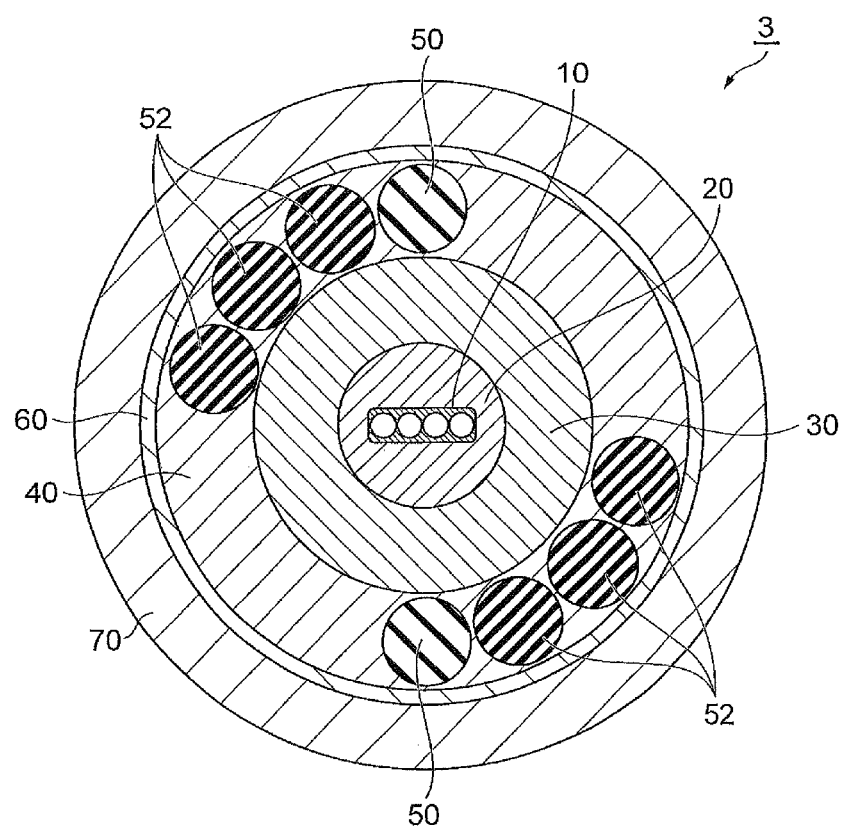
FIG. 3 is a cross-sectional view of an, optical cable according to a third embodiment.

FIG. 3 is a cross-sectional view of an optical cable 3 according to a third embodiment. FIG. 3 illustrates a cross section perpendicular to the axial direction of the optical cable 3. The optical cable 3 includes an optical fiber ribbon core wire 10, a tension fiber 20, an inner tube 30, plastic yarn 40, coaxial electric wires 50, a braid 60, and a sheath 70, in the same manner as in the optical cable 1 according to the first embodiment. However, the optical cable 3 according to the third embodiment differs from the first embodiment in that it further includes six insulated electric wires 52.

The insulated electric wires 52 are used, for example, to provide a power feed function. A set of three insulated electric wires 52 is arranged in a space between the inner tube 30 and the braid 60 to be symmetric with another set of three. The insulated electric wires 52 arranged in this way as well as the coaxial electric wires 50 have their surrounding space filled with the plastic yarn 40. The coaxial electric wires 50, the insulated electric wires 52, and the plastic yarn 40 are arranged so as to be twisted around the outer periphery of the inner tube 30, for example, at 60 mm pitch in the axial direction of the optical cable 3, in the same manner as in the first and second embodiments. The outer periphery of the coaxial electric wires 50, the insulated electric wires 52, and the plastic yarn 40 is preferably pressure-wrapped with a paper tape or the like in order to prevent deformation.

Figure 4:
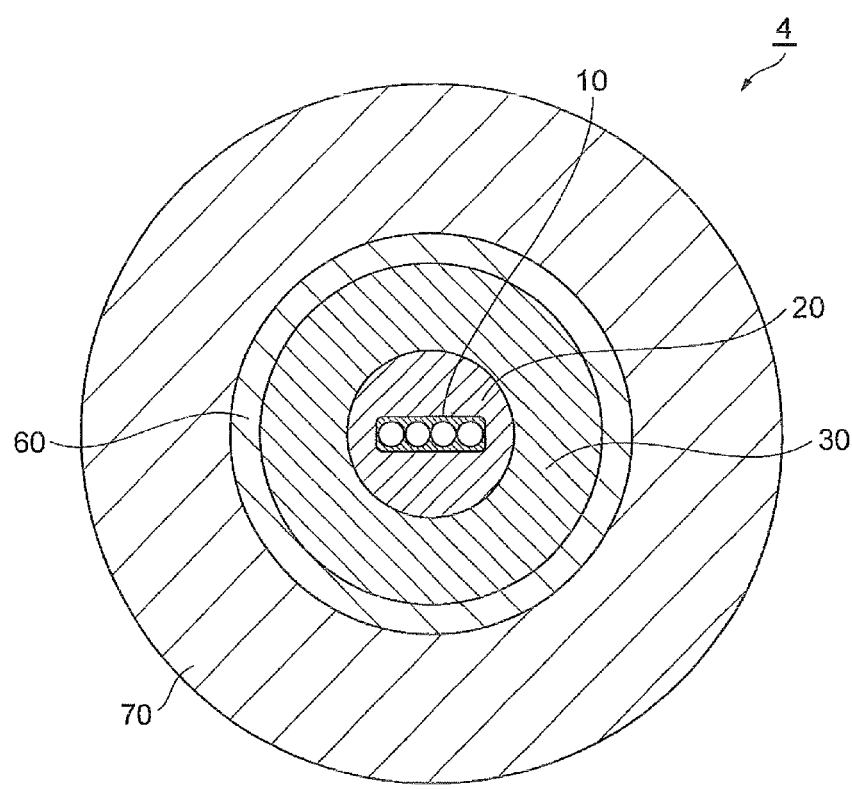
FIG. 4 is a cross-sectional view of an optical cable according to a fourth embodiment.

FIG. 4 is a cross-sectional view of an optical cable 4 according to a fourth embodiment. FIG. 4 illustrates a cross section perpendicular to the axial direction of the optical cable 4. The optical cable 4 includes an optical fiber ribbon core wire 10, a tension fiber 20, an inner tube 30, a braid 60, and a sheath 70, in the same manner as in the optical cable 1 according to the first embodiment. However, the optical cable 4 according to the fourth embodiment differs from the first embodiment in that it does not include the coaxial electric wires 50 and the plastic yarn 40 covering the coaxial electric wires 50 and that the braid 60 is arranged immediately on the outer periphery of the inner tube 30.

Figure 5:
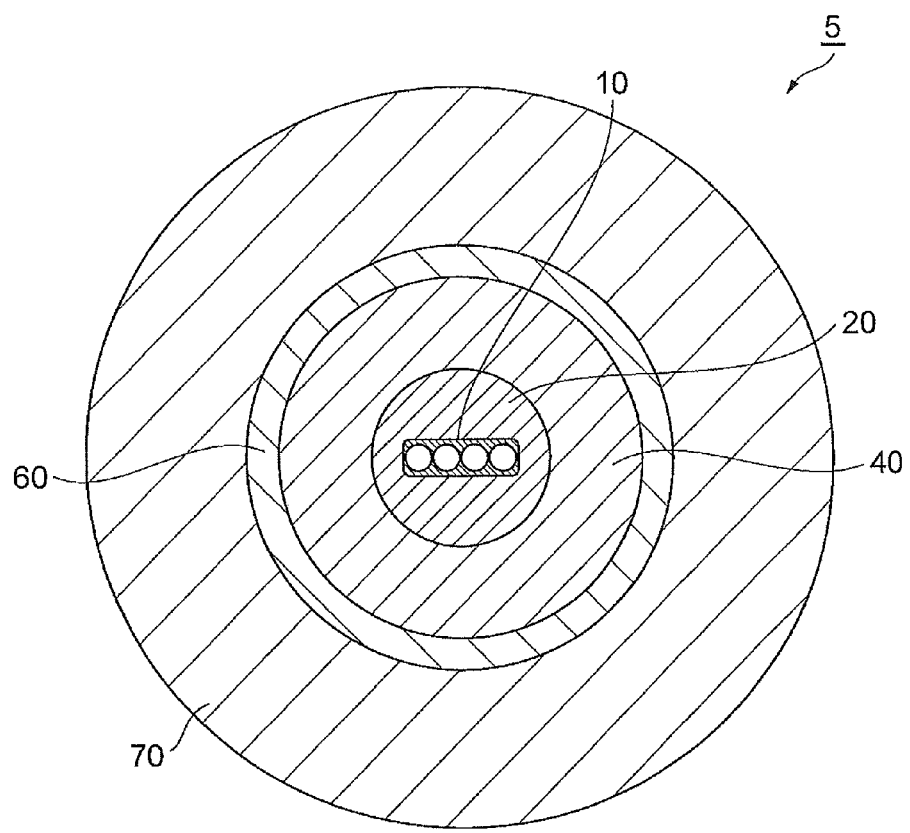
FIG. 5 is a cross-sectional view of an optical cable according to a fifth embodiment.

FIG. 5 is a cross-sectional view of an optical cable 5 according to a fifth embodiment. FIG. 5 illustrates a cross section perpendicular to the axial direction of the optical cable 5. The optical cable 5 includes an optical fiber ribbon core wire 10, a tension fiber 20, plastic yarn 40, a braid 60, and a sheath 70, in the same manner as in the optical cable 1 according to the first embodiment. However, the optical cable 5 according to the fifth embodiment differs from the first embodiment in that it does not include the inner tube 30 and the coaxial electric wires 50 and that the tension fiber 20 is surrounded with the plastic yarn 40.

In the optical cables 1 to 5 according to the foregoing first to fifth embodiments, the wire such as copper wire that forms the braid 60 is dug into the sheath 70 so that the sheath 70 is integrated with the braid 60 to allow the braid 60 to function as a shrink-resistant member. With this configuration, the shrinkage of the sheath 70 integrated with the braid 60 is suppressed, whereby serpentine of the optical fibers caused by the shrinkage of the sheath 70 due to low temperatures is suppressed, and increase in transmission loss of the optical cables 1 to 5 is prevented. The flexibility of the optical cables 1 to 5 can be kept because the braid 60 is used as a shrink-resistant member.

In the optical cables 1 to 5, the adhesion force between the sheath 70 and the braid 60 is 0.25 N/mm or more and 3.0 N/mm or less. If the adhesion force between the sheath 70 and the braid 60 is less than 0.25 N/mm, the temperature characteristic of the optical cable is poor, whereas if the adhesion force between the sheath 70 and the braid 60 exceeds 3.0 N/mm, removal of the sheath 70 is difficult, resulting in poor terminal workability. The optical cables 1 to 5, however, do not pose such problems. That is, a predetermined temperature characteristic can be achieved while the workability is enhanced.

In the optical cables 1 to 5, when the optical cables 1 to 5 are each cut into 15 cm and heated at 110° C. for two hours, the shrinkage ratio of the sheath 70 is 1.0% or less. The use of such a sheath 70 can further improve the temperature characteristic of the optical cables 1 to 5.

The optical cables 1, 3, 4 further include the inner tube 30 arranged inside the braid 60 and the tension fiber 20, wherein the optical fibers and the tension fiber 20 are arranged in the interior space of the inner tube 30. It follows that the inner tube 30 is present between the optical fibers and the braid 60 thereby preventing the optical fibers from coming into direct contact with the braid 60. The presence of the inner tube 30 can also improve the shock characteristic. The arrangement of the tension fiber 20 and the optical fibers in the same space can further improve the shock characteristic.

The optical cables 1 to 3 further include electric wires 50, 52 inside the braid 60. Accordingly, the optical cables are provided with a power feed function and a slow signal communication function.

The optical cables 1 to 3 and 5 further include the plastic yarn 40 inside the braid 60. When the core before braiding is not circular, projections and depressions are formed on the cable to cause poor appearance. For example, when a metal wire is arranged, the plastic yarn 40 is arranged and filled in the space on the outer periphery of the metal wire to keep the core before braiding in the shape of a circle.

In the optical cables 1 to 5, the optical fibers are in the shape of a ribbon. This can prevent the optical fibers from intersecting each other and improve the lateral pressure characteristic of the optical cables.

In the optical cables 1 to 5, the diameter of the glass region that forms an optical fiber is 105 μm or less. This can reduce the possibility of breakage of the optical cables 1 to 5 due to bending.

EXAMPLES

The present invention will be described in details below with Examples. However, the present invention should not be limited to these Examples.

First, optical cables under the conditions illustrated in FIG. 12 were fabricated as Examples 1 to 10 and Comparative Example. The cable structures A-1 to A-5 illustrated in FIG. 12 correspond to the structures of the optical cables 1 to 5 illustrated in FIGS. 1 to 5, respectively. The optical fiber structures B-1 to B-5 illustrated in FIG. 12 correspond to the structures of the optical fiber ribbon core wires 10A to 10E illustrated in FIG. 6 to FIG. 10, respectively, and their specific diameters are as illustrated in FIG. 13, In the optical cable of Comparative Example, the sheath and the braid generally do not adhere to each other and are not integrated. The withdrawal force and the adhesion force between the sheath and the braid were obtained by the foregoing method.

The optical cables of Examples 1 to 10 and Comparative Example underwent sheath shrinkage ratio tests, temperature characteristic tests, lateral pressure tests, bending tests, shock tests, and pinch tests under the conditions below to obtain measurements. The measurement results are as illustrated in FIG. 14. A VCSEL (Vertical Cavity Surface Emitting LASER) with a light output region having a size of 10 μm on each side was used as a light input unit to the optical cable and was optically coupled to an end surface of the optical fiber through a lens. Meanwhile, a photodiode (PD) with a light-receiving region having a size of 100 μm on each side was used as a light output unit of the optical cable and was optically coupled to an end surface of the optical fiber.

<Sheath Shrinkage Ratio>

Each cable was cut into 15 cm and put on talc to be heated at 110° C. for two hours. The shrinkage ratio was measured by measuring the lengths of the sheath of the cable before and after heating.

<Temperature Characteristic>

A heat cycle of 0° C. (four hours) ⇆ 85° C. (four hours) was performed ten times to obtain a transmission loss [dB]. The evaluation criteria are as follows.

A . . . less than 0.5 dB/km
B . . . 0.5 dB/km or more to less than 2.0 dB/km
C . . . 2.0 dB/km or more <Lateral Pressure Test>

A transmission loss [dB] was obtained when a mandrel having a diameter of 60 mm was put on each cable and a load of 350 N was applied on the mandrel. The evaluation criteria are as follows.

A . . . less than 0.5 dB
B . . . 0.5 dB or more to less than 2.0 dB
C . . . 2.0 dB or more <Bending Test>

A transmission loss [dB] was obtained when each cable was wound ten turns around a mandrel having a diameter of 10 mm. The evaluation criteria are as follows.

A . . . less than 0.5 dB
B . . . 0.5 dB or more to less than 2.0 dB
C . . . 2.0 dB or more <Shock Test>

A transmission loss [dB] was obtained when a 0.5 kg weight having an edge with a radius R of 12.5 mm was dropped twice from a height of 15 cm at the same position on each cable. The evaluation criteria are as follows.

A . . . less than 0.5 dB
B . . . 0.5 dB or more to less than 2.0 dB
C . . . 2.0 dB or more, or breakage of the fiber <Pinch Test>

A time taken for breakage of the optical fiber was obtained with each cable kept folded 180 degrees at a point. The evaluation criteria are as follows.

A . . . one month or longer
B . . . one week or longer to shorter than one month
C . . . shorter than one week On the evaluation criteria in each test as described above, the product evaluated as "A (good)" is preferred in terms of reliability. However, the product evaluated as "B (standard)" or higher is considered as being acceptable because even the product evaluated as "B (standard)" is practically usable.

As a result, in all of Examples 1 to 10, the wire that forms the braid is dug into the inside of the sheath, the adhesion force between the sheath and the braid is 0.25 N/mm or more and 3.0 N/mm or less, and the "temperature characteristic" is "good". The optical cables of Examples 1 to 10 have a sheath shrinkage ratio of 1.0% or less. Also in this respect, the "temperature characteristic" is "good". In contrast, the optical cable of Comparative Example has no stitches on the inside of the sheath with the adhesion force as low as 0.2 [N/min] and therefore is determined as "C (failed)" in the "temperature characteristic". The optical cable of Comparative Example has a sheath shrinkage ratio as high as 3.8%. Also in this respect, the "temperature characteristic" is determined as "C (failed)". In Comparative Example, serpentine of the optical fiber in the cable was observed after the heat cycles. In Examples, serpentine of the optical fiber in the cable was not observed even after the heat cycles.

The optical cables of Examples 1 to 3 and 5 to 10 have a numerical aperture NA as large as 0.29 and therefore are determined as "good" in the "bending test". Examples 1 to 4 and 6 to 10 are determined as "good" in the "pinch test" because the glass diameter of the optical fiber is 105 μm or less. The optical cables of Examples 1 to 5 and 7 to 9, which have the inner tube, are determined as "good" in the "lateral pressure test" and "shock test" because the optical fiber is unlikely to come into contact with the metal wire or the braid with lateral pressure.

What is claimed is:

1. An optical cable comprising:
   an optical fiber having a core and a cladding that surrounds the core;
   a sheath that surrounds the optical fiber; and
   a braid arranged inside the sheath, the braid formed to include a wire,
   wherein the wire that forms the braid is pushed into the sheath so that the sheath is integrated with the braid,
   wherein an adhesion force between the sheath and the braid is 0.25 N/mm or more and 3.0 N/mm or less.

2. The optical cable according to claim 1, wherein a shrinkage ratio of the sheath is 1.0% or less when the optical cable is heated at 110° C. for two hours.

3. The optical cable according to claim 1, further comprising:
   an inner tube arranged inside the braid; and
   a tension fiber,
   wherein the optical fiber and the tension fiber are arranged in an interior space of the inner tube.

4. The optical cable according to claim 1, further comprising a metal wire arranged inside the braid.

5. The optical cable according to claim 4, wherein the metal wire is a coaxial wire.

6. The optical cable according to claim 1, further comprising plastic yarn placed inside the braid.

7. The optical cable according to claim 1, wherein the optical fiber is in the shape of a ribbon.

8. The optical cable according to claim 1, wherein a diameter of a glass region that forms the optical fiber is 105 μm or less.

9. The optical cable according to claim 1, wherein the core of the optical fiber is made of glass, and the cladding of the optical fiber is made of plastic.

* * * * *